US012579788B2

(12) United States Patent
Doretto et al.

(10) Patent No.: US 12,579,788 B2
(45) Date of Patent: Mar. 17, 2026

(54) SYSTEMS AND METHODS FOR DOMAIN ADAPTIVE OBJECT INSTANCE SEGMENTATION

(71) Applicant: West Virginia University Board of Governors on Behalf of West Virginia University, Morgantown, WV (US)

(72) Inventors: Gianfranco Doretto, Morgantown, WV (US); Matthew Richardson Keaton, Morgantown, WV (US)

(73) Assignee: WEST VIRGINIA UNIVERSITY BOARD OF GOVERNORS ON BEHALF OF WEST VIRGINIA UNIVERSITY, Morgantown, WV (US)

( * ) Notice: Subject to any disclaimer, the term of this patent is extended or adjusted under 35 U.S.C. 154(b) by 415 days.

(21) Appl. No.: 18/118,566

(22) Filed: Mar. 7, 2023

(65) Prior Publication Data

US 2023/0281970 A1 Sep. 7, 2023

Related U.S. Application Data

(60) Provisional application No. 63/382,233, filed on Nov. 3, 2022, provisional application No. 63/317,528, filed on Mar. 7, 2022.

(51) Int. Cl.
*G06V 10/74* (2022.01)
*G06T 7/11* (2017.01)
(Continued)

(52) U.S. Cl.
CPC .............. *G06V 10/774* (2022.01); *G06T 7/11* (2017.01); *G06V 10/761* (2022.01); *G06V 10/82* (2022.01);
(Continued)

(58) Field of Classification Search
CPC .... G06V 10/774; G06V 10/761; G06V 10/82; G06V 20/695; G06V 10/764; G06T 7/11;
(Continued)

(56) References Cited

U.S. PATENT DOCUMENTS

| | | | | |
|---|---|---|---|---|
| 2018/0136215 | A1* | 5/2018 | Jarrard | G01N 33/57434 |
| 2022/0207744 | A1* | 6/2022 | Tian | G06T 7/194 |
| 2023/0334882 | A1* | 10/2023 | Kim | G06V 20/698 |

OTHER PUBLICATIONS

Stringer, Carsen, et al. "Cellpose: a generalist algorithm for cellular segmentation." Nature methods 18.1 (2021): 100-106.https://www.nature.com/articles/s41592-020-01018-x (Year: 2021).*
(Continued)

*Primary Examiner* — Han Hoang
(74) *Attorney, Agent, or Firm* — Kramer & Amado, P.C.

(57) ABSTRACT

System and methods for object segmentation include providing a pre-trained neural network model to segment object instances based on a first set of images and a first loss function. The neural network, for a pixel, can generate a gradient flow that points towards a center of an object structure and provides a probability score indicating a probability of the pixel belonging to the object structure. An adapted neural network model can be generated from the pre-trained neural network model to account for domain shifted new input images by training the pre-trained neural network model on a second set of images and a loss function that comprises a contrastive flow loss component and a contrastive mask loss component.

20 Claims, 7 Drawing Sheets

(51) Int. Cl.
  *G06V 10/774*        (2022.01)
  *G06V 10/82*         (2022.01)
  *G06V 20/69*         (2022.01)

(52) U.S. Cl.
  CPC ....................... *G06V 20/695* (2022.01); *G06T 2207/20076* (2013.01); *G06T 2207/20081* (2013.01); *G06T 2207/20084* (2013.01); *G06T 2207/30004* (2013.01)

(58) Field of Classification Search
  CPC ........... G06T 2207/20076; G06T 2207/20081; G06T 2207/20084; G06T 2207/30004; G06T 2207/30024
  See application file for complete search history.

(56)                References Cited

OTHER PUBLICATIONS

Wei, Fangyun, et al. "Aligning Pretraining for Detection via Object-Level Contrastive Learning." arXiv preprint arXiv:2106.02637 (2021). https://arxiv.org/abs/2106.02637 (Year: 2021).*

* cited by examiner

1

SYSTEMS AND METHODS FOR DOMAIN ADAPTIVE OBJECT INSTANCE SEGMENTATION

CROSS-REFERENCE TO RELATED APPLICATIONS

This application claims priority to U.S. Provisional Application No. 63/317,528, filed Mar. 7, 2022, entitled "Robust Image Quantification for Detection, Segmentation, Tracking, and Counting of Instances via Domain Adaptive Methods," and to U.S. Provisional Application No. 63/382,233, filed Nov. 3, 2022, entitled "Robust Image Quantification for Detection, Segmentation, Tracking, and Counting of Instances via Domain Adaptive Methods," both of which are incorporated by reference herein in their entirety.

STATEMENT REGARDING FEDERALLY SPONSORED RESEARCH OR DEVELOPMENT

This invention was made with government support under Award Number R44 MH125238 awarded by the National Institutes of Health and under Grant No. 1920920 awarded by the National Science Foundation. The government has certain rights in the invention.

TECHNICAL FIELD

This disclosure relates to neural network-based image segmentation, and in particular to object instance segmentation in images.

DESCRIPTION OF THE RELATED TECHNOLOGY

Image segmentation divides an image into multiple regions or segments for analysis. In neural network-based image segmentation, a deep learning model can be trained to identify and label different regions of an image based on the patterns and features present in the data. The deep learning model can be trained on a set of training images that include the segmented regions and the labels associated with the regions. Once trained, the model can provide feature maps and labels for test images, where the feature maps correspond to the segmented objects within the test images.

The advantages of neural network-based image segmentation include its accuracy and speed. Compared to traditional image processing techniques, neural network-based segmentation can be more precise and requires less manual intervention. This makes it a valuable tool in fields such as medical imaging, where accurate segmentation of images is beneficial for diagnosis and treatment.

SUMMARY

In some aspects, the techniques described herein relate to a method for object segmentation, including: providing a neural network model pre-trained to segment object instances, the pre-trained model having been trained on a first set of images using a first loss function, wherein for an input image, the neural network model generates a pixel-wise feature where for a pixel in the input image, the pixel-wise feature provides a gradient flow that points towards a center of an object structure and provides a probability score indicating a probability of the pixel belonging to the object structure; generating an adapted neural network model from the neural network model based on a second set of images that is smaller than and different from the first set of images and a second loss function, wherein the second loss function includes a contrastive flow loss component and a contrastive mask loss component, wherein the contrastive flow loss component aligns gradient flows of pixels in the second set of images with gradient flows of pixels in the first set of images having a same label as the pixels in the second set of images, and wherein the contrastive mask loss component aligns probability scores of the pixels in the second set of images with probability scores of pixels in the first set of images having a same label as the pixels in the second set of images; and segmenting object instances in a test image based on the adapted neural network model.

In some aspects, the techniques described herein relate to a method, wherein the second set of images includes at least one and at most ten images.

In some aspects, the techniques described herein relate to a method, wherein the object instances include cellular instances and wherein the object structure includes a cell structure.

In some aspects, the techniques described herein relate to a method, wherein generating the adapted neural network model from the neural network model includes training the neural network model on each image of the second set of images.

In some aspects, the techniques described herein relate to a method, wherein the neural network model is a Cellpose neural network model.

In some aspects, the techniques described herein relate to a method, wherein aligning gradient flows of pixels in the second set of images with gradient flows of pixels in the first set of images having the same label as the pixels in the second set of images includes: identifying a positive pixel in the first set of images that has the same label as a first pixel in the second set of images and has a gradient flow that is closest to a gradient flow of the first pixel, identifying a set of negative pixels in the first set of images that have the same label as the first pixel in the second set of images, wherein a similarity measure between the gradient flow of the positive pixel and the gradient flow of each negative pixel of the set of negative pixels is less than a threshold value, and adjusting parameters of the neural network model such that the gradient flow of the positive pixel gets closer to the gradient flow of the first pixel and gradient flow of each of the negative pixels gets more dissimilar to the gradient flow of the first pixel.

In some aspects, the techniques described herein relate to a method, wherein the similarity measure is determined based on cosine similarity.

In some aspects, the techniques described herein relate to a method, wherein the contrastive flow loss component is determined based on an aggregate of comparative flow loss associated with each of a plurality of pixels in image patches of the first set of images and the second set of images.

In some aspects, the techniques described herein relate to a method, wherein a number of the set of negative pixels is selected to be the same for all pixels from the second set of images.

In some aspects, the techniques described herein relate to a method, wherein aligning probability scores of the pixels in the second set of images with probability scores of pixels in the first set of images having a same label as the pixels in the second set of images includes: identifying a set of positive pairs of probability scores, each positive pair of probability score corresponding to pixels with the same label in same positions in an image patch of the first set of images and an image patch of the second set of images and, identifying a set of negative pairs of probability scores, each negative pair of probability score corresponding to pixels with different labels in same positions in the image patch in the first set of images and in the image patch in the second set of images, and adjusting parameters of the neural network model such that a measure of similarity between pairs of pixels with the same label is maximized and a measure of similarity between pairs of pixels with different labels is minimized.

In some aspects, the techniques described herein relate to a method, wherein whether pixels are in same positions is determined by overlapping the image patch of the first set of images with the image patch of the second set of images.

In some aspects, the techniques described herein relate to a non-transitory computer readable storage medium including instructions which when executed by one or more processors cause the processor to execute a method including: providing a neural network model pre-trained to segment object instances, the pre-trained model having been trained on a first set of images using a first loss function, wherein for an input image, the neural network model generates a pixel-wise feature where for a pixel in the input image, the pixel-wise feature provides a gradient flow that points towards a center of an object structure and provides a probability score indicating a probability of the pixel belonging to the object structure; generating an adapted neural network model from the neural network model based on a second set of images that is smaller than and different from the first set of images and a second loss function, wherein the second loss function includes a contrastive flow loss component and a contrastive mask loss component, wherein the contrastive flow loss component aligns gradient flows of pixels in the second set of images with gradient flows of pixels in the first set of images having a same label as the pixels in the second set of images, and wherein the contrastive mask loss component aligns probability scores of the pixels in the second set of images with probability scores of pixels in the first set of images having a same label as the pixels in the second set of images; and segmenting object instances in a test image based on the adapted neural network model.

In some aspects, the techniques described herein relate to a non-transitory computer readable storage medium, wherein the second set of images includes at least one and at most ten images.

some aspects, the techniques described herein relate to a non-transitory computer readable storage medium, wherein the object instances include cellular instances and wherein the object structure includes a cell structure.

In some aspects, the techniques described herein relate to a non-transitory computer readable storage medium, wherein generating the adapted neural network model from the neural network model includes training the neural network model on each image of the second set of images.

In some aspects, the techniques described herein relate to a non-transitory computer readable storage medium, wherein the neural network model is a Cellpose neural network model.

In some aspects, the techniques described herein relate to a non-transitory computer readable storage medium, wherein aligning gradient flows of pixels in the second set of images with gradient flows of pixels in the first set of images having the same label as the pixels in the second set of images includes: identifying a positive pixel in the first set of images that has the same label as a first pixel in the second set of images and has a gradient flow that is closest to a gradient flow of the first pixel, identifying a set of negative pixels in the first set of images that have the same label as the first pixel in the second set of images, wherein a similarity measure between the gradient flow of the positive pixel and the gradient flow of each negative pixel of the set of negative pixels is less than a threshold value, and adjusting parameters of the neural network model such that the gradient flow of the positive pixel gets closer to the gradient flow of the first pixel and gradient flow of each of the negative pixels gets more dissimilar to the gradient flow of the first pixel.

In some aspects, the techniques described herein relate to a non-transitory computer readable storage medium, wherein the similarity measure is determined based on cosine similarity.

In some aspects, the techniques described herein relate to a non-transitory computer readable storage medium, wherein the contrastive flow loss component is determined based on an aggregate of comparative flow loss associated with each of a plurality of pixels in image patches of the first set of images and the second set of images.

In some aspects, the techniques described herein relate to a non-transitory computer readable storage medium, wherein a number of the set of negative pixels is selected to be the same for all pixels from the second set of images.

In some aspects, the techniques described herein relate to a non-transitory computer readable storage medium, wherein aligning probability scores of the pixels in the second set of images with probability scores of pixels in the first set of images having a same label as the pixels in the second set of images includes: identifying a set of positive pairs of probability scores, each positive pair of probability score corresponding to pixels with the same label in same positions in an image patch of the first set of images and an image patch of the second set of images and, identifying a set of negative pairs of probability scores, each negative pair of probability score corresponding to pixels with different labels in same positions in the image patch in the first set of images and in the image patch in the second set of images, and adjusting parameters of the neural network model such that a measure of similarity between pairs of pixels with the same label is maximized and a measure of similarity between pairs of pixels with different labels is minimized.

In some aspects, the techniques described herein relate to a non-transitory computer readable storage medium, wherein whether pixels are in same positions is determined by overlapping the image patch of the first set of images with the image patch of the second set of images.

BRIEF DESCRIPTION OF THE DRAWINGS

Like reference numbers and designations in the various drawings indicate like elements.

DETAILED DESCRIPTION

Figure 1:
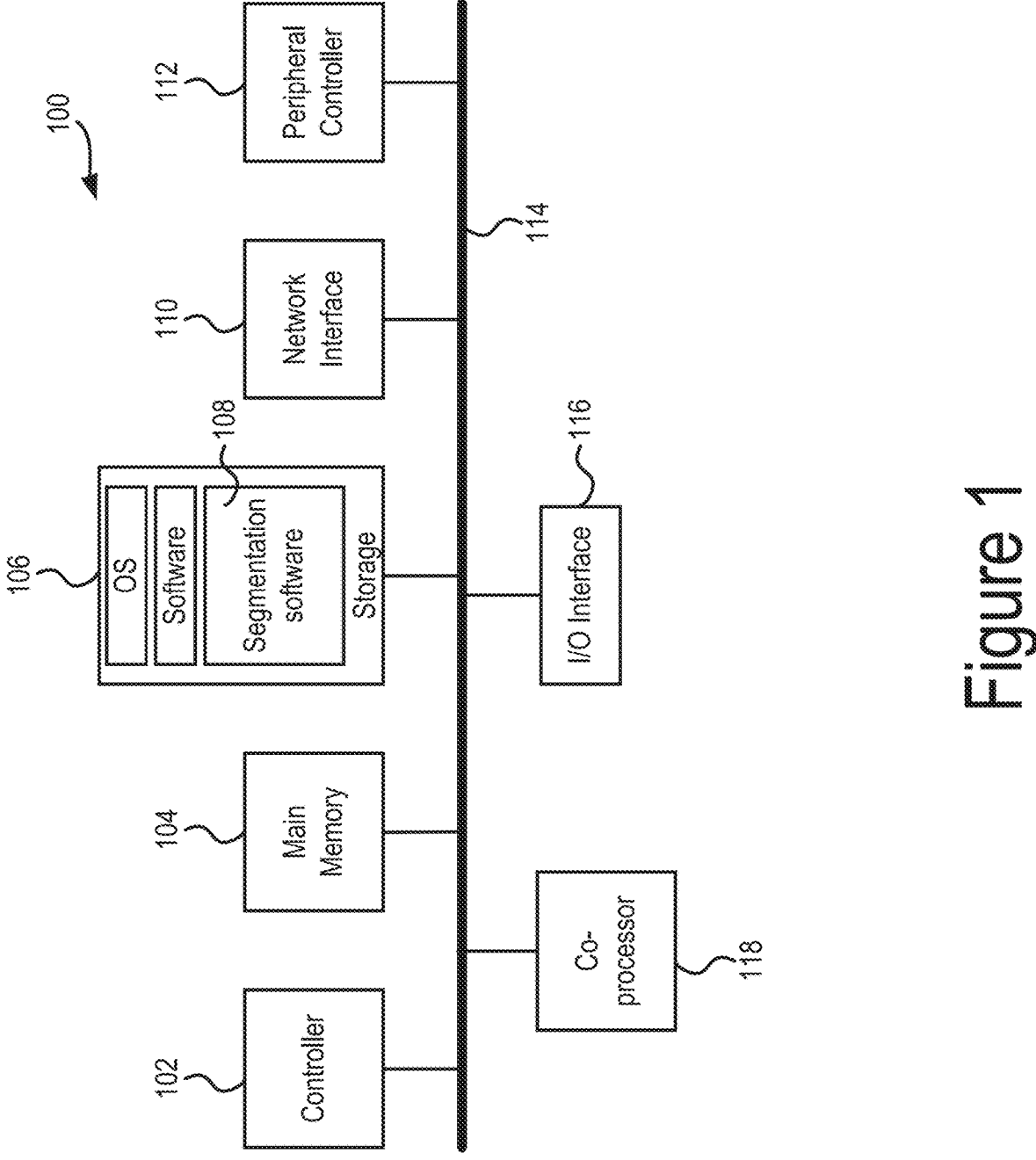
FIG. 1 shows a block diagram of an example computing system that can be utilized for cell segmentation.

The various concepts introduced above and discussed in greater detail below may be implemented in any of numerous ways, as the described concepts are not limited to any particular manner of implementation. Examples of specific implementations and applications are provided primarily for illustrative purposes.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Prior to describing the various aspects of the present disclosure, the following definitions are provided and should be used unless otherwise indicated. Additional terms may be defined elsewhere in the present disclosure.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of,"

"including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used herein, the term "and/or" includes any and all combinations of one or more of the associated listed items. Expressions such as "at least one of," when preceding a list of elements, modify the entire list of elements and do not modify the individual elements of the list.

As used in the specification and the appended claims, the singular forms "a," "an" and "the" include plural referents unless the context clearly dictates otherwise. Thus, for example, reference to "a proton beam degrader," "a degrader foil," or "a conduit," includes, but is not limited to, two or more such proton beam degraders, degrader foils, or conduits, and the like.

The various concepts introduced above and discussed in greater detail below may be implemented in any of numerous ways, as the described concepts are not limited to any particular manner of implementation. Examples of specific implementations and applications are provided primarily for illustrative purposes.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

Automating the analysis of scientific imaging data via computer vision techniques is becoming increasingly commonplace. To accelerate scientific discovery, some neural network-based methods automatically segment and count individual instances of cells in laboratory-produced imaging data [44, 51, 14]. Such type of data acquisitions exhibit a remarkable variability, which is due to the large variety of imaging modalities being used, the different types of tissues and how they are processed.

Traditional approaches to cell instance segmentation are mainly based on supervised learning. They are trained on large datasets in an attempt to compensate for the diversity of the new data they are meant to be used on. However, new data to process may not be distributed in the same way as the data used for training the models, so, they will perform the task, often with disappointing accuracy. To address this covariate shift problem [42], one solution is retraining the models, which is costly and time consuming because it requires manual annotation of large amounts of the new target data. An alternative is to use domain adaptation methods, which attempt to adapt the model to the target data distribution. Traditional domain adaptation methods for segmentation are by and large tailored to imaging modalities, or specific tasks or applications that are very different than cell instance segmentation [15, 53]. Some techniques have addressed the problem in an unsupervised manner [26, 27]. But these approaches assume that a large fraction and amount of target data is available to undergo a relatively intense training to adapt the model.

The systems and methods discussed herein provide a practical and scalable solution to address the need to generalize well out of distribution. The approaches assume that a model for segmenting instances, such as cell bodies, membranes, or nuclei, has already being trained on a source dataset. Then, by annotating only a handful of samples of the target dataset the approaches adapt the model, with a low training budget, to generalize well on the new distribution. The approaches introduce "CellTranspose," that implements the paradigm just described, for the few-shot supervised adaption of cell instance segmentation. The approach builds on existing segmenting models by introducing new losses and a training procedure for quick adaptation of the models to new data. The framework allows for a broad range of data to be properly segmented beyond the capabilities of current generalist approaches. Only a small number of annotations on the target dataset can be utilized for the model to learn to produce high-fidelity segmentations and demonstrate this both on 2-D and 3-D data. In particular, few annotated samples are sufficient also to reach adaptation levels comparable to the unsupervised adaptation models. Additionally, CellTranspose affords a much faster training scheme as compared to training a model with similar accuracy from scratch.

Cellular Instance Segmentation

Some cell instance segmentation techniques include a neural network model that generates a pixel-wise feature where for a pixel in the input image, the pixel-wise feature provides a gradient flow that points towards a center of a cell structure and provides a probability score indicating a probability of the pixel belonging to the cell structure. Cellpose is one example of such neural network models for cell instance segmentation [44]. Like many segmentation algorithms, Cellpose's underlying model is a variant of U-Net [38], outputting a pixel-wise mask prediction. By itself, this only produces a semantic segmentation: the output mask merely determines the class of each pixel (foreground/cell or background), making it impossible to delineate between individual cells when they are clustered together. Based on traditional watershed algorithm [3] and a gradient-based deep pose recognition algorithm called OpenPose [5], Cellpose contains two additional outputs corresponding to predicted gradients towards each pixel's associated cell source location, one in the x-direction and another in the y-direction. Through an iterative process, the gradient of each pixel is followed to neighboring pixels until a "source" pixel representing a cell center is encountered. Each pixel directly linked to the source is then considered a part of the cell instance, in this way constructing segmentations of individual cells.

Similar to Cellpose, Mesmer [14] represents another variant of "deep watershed" algorithms, also producing a pixel-wise mask prediction, but instead of the two flow outputs it can generate an "inner distance transform" to predict the distance of each pixel to a cell's center. StarDist [40] and StarDist-3D [51] can predict object centers and then approximate the distance from the given location to cell boundaries at fixed angles from the center. The points defined by these predictions are then connected to each neighboring point to produce the outline of the cell's mask. Other approaches include NuSeT [57], which also builds on the watershed algorithm, and DenoiSeg [4], which utilizes a joint learning strategy in concert with a denoising task to produce better accuracy on noisy samples. It should be noted that segmentation algorithms such as Cellpose and Mesmer, while developed initially for cellular segmentation, may be utilized for segmentation of objects other than cells in images.

Domain Adaptation

A common issue in deep learning practice is the scarcity of labeled data for many tasks and the often unrealistic requirement to produce vast amounts of costly annotations in order to appropriately train a model. Although many efforts have been made to produce "generalist" models which are invariant across different datasets for a specific task, doing so is intractable in real-world applications where data has intrinsically high variability. Domain adaptation allows for taking a high-performing model trained on a large dataset and adapting it to work on new data representing some target domain. This enables the model to take advantage of learned low-level features acquired from the larger source dataset while tuning to the specific features of the target dataset, requiring less target data.

In addition to a few domain adaptation approaches on semantic segmentation for various imaging modalities including brain tumors [10, 47, 12], whole tissue [65], and organelles [2], several unsupervised mechanisms for semantic segmentation [55, 22, 19, 49, 36, 9, 1, 11, 21, 20, 63, 62, 7, 54, 56, 37, 41, 35, 23] and the more challenging instance segmentation task [26, 27, 58, 24] have been proposed. Generally, these unsupervised methods aim to learn representations of a given target domain without the use of any annotations. This greatly reduces the need for effort from medical experts while producing better segmentations than non-adapted models. However, this is accompanied by a clear trade-off with model accuracy, and the training scheme, in addition to more complex model architectures, causing training time to increase heavily. There is also an intrinsic expectation for the shape and relative size of segmentations from the target data to match closely with those of the source dataset, constraining such approaches to nuclei segmentation rather than more heterogeneous full-cell segmentations. These methods are also notably not "generalist," and tend to focus on and perform best on a particular cell or imaging type.

Few-Shot Domain Adaptation

In order to accommodate many real-world settings, one set of techniques known as "few-shot" domain adaptation aims to balance the demand for annotations with overall model performance. Since at least one large dataset is often available for a given task, many of the weaknesses posed by few-shot learning on its own can be avoided. Some popular techniques for addressing domain adaptation with a limited number of target samples includes utilizing adversarial techniques to increase the confusion between the source and target domain [32], using meta-learning approaches to use tasks from one domain for adversarially learning tasks in a smaller, novel domain [39], and generating proto-types based on learned embeddings from the few target samples [64], a technique common to few-shot learning. One which has proven effective across multiple paradigms is the use of contrastive losses [16]. A contrastive loss function encourages each sample from the target domain to be represented similarly to one or more samples of the same class (positive samples) in the source domain while simultaneously pushing its representation away from samples from other classes (negative samples) within the source domain. This approach has proven successful in a number of scenarios including domain adaptation [25, 50, 28], unsupervised learning [48, 66, 30, 45, 18, 6], self-supervised learning [8, 59, 31], meta-learning [39], and even few-shot domain adaptation [33].

FIG. 1 shows a block diagram of an example computing system 100 that can be utilized for cell segmentation. The computing system 100 can include a processor 102, a main memory 104, a non-transitory memory storage 106, a network interface 110, a peripheral controller 112, a communication bus 114, a I/O interface 116, and a co-processor 118.

The processor 102 can include one or more central processing units, a microcontroller, a programmable logic controller, or any other programmable controller or processor. The main memory 104 can include volatile memory such as, for example, a random-access memory (RAM). The non-transitory memory storage 106 (also referred to as a "non-transitory computer readable storage medium") can be a non-volatile memory storage such as, for example, a hard drive, a disk drive, a USB drive, a flash memory drive, etc. The non-transitory memory storage 106 can store software such as, for example, one or more operating systems, a segmentation software 108, and other user software. The network interface 110 can allow communication with local and/or wide area networks. The peripheral controller 112 can communicate with peripheral devices such as, for example, keyboards, mice, display devices, and other such user devices. The I/O interface 116 can allow communication with other computing devices. The co-processor 118 can include processors or controller that can receive specialized processing tasks from the processor 102. For example, the co-processor 118 can include floating point units, graphics processing units (GPUs), etc. In some examples, the processor 102 can utilize the co-processor 118 to aid in executing neural network operations during training the neural network model or during inference.

Figure 2:
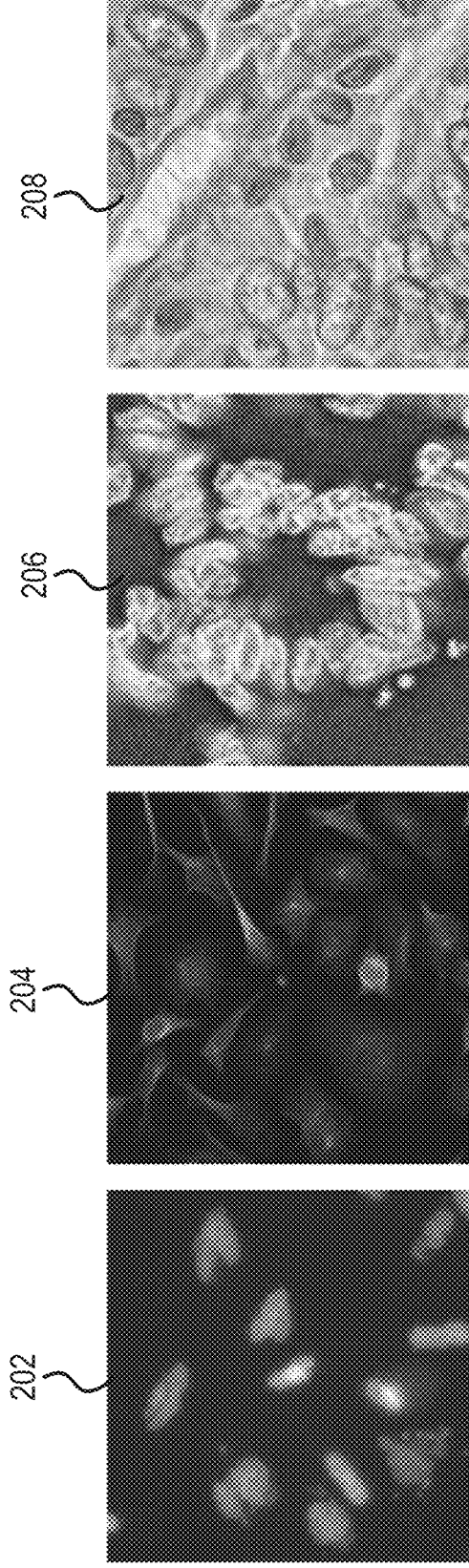
FIG. 2 shows image samples highlighting the variability of cell images.

The segmentation software 108 can operate on input images to provide segmentation of instances of objects in general, where the objects can include cell bodies, membranes, or nuclei present in the images. While the segmentation software 108 discussed herein is described in relation to cellular segmentation, a person skilled in the art can appreciate that the segmentation techniques can be readily applied to segment any object or object structures within images. Such objects can include, without limitation, people, animals, livestock, vehicles, vegetation, topology, architecture, urban or rural landscape, etc. Such image structures can have a high degree of variability on account of being acquired with a variety of different image capturing techniques such as, for example in particular for cellular objects, microscopy techniques, and can come from a diverse range of tissues, and present very different shapes. FIG. 2 shows image samples highlighting the variability of cell images. Specifically, FIG. 2 shows a first image sample 202 depicting human U2OS cells with Hoechst and phalloidin stains from BBBC006 [29]; a second image 204 shows neuroblastoma cells labeled with phalloidin and DAPI stains from the Cell Image Library [60]. The third image 206 shows GI tissue cells image by co-detection by indexing (CODEX) from Tissuenet [14]. The images shown in FIG. 2 show high degree of variability in color, quality, density, etc. Therefore, even state-of-the-art supervised instance-based segmentation approaches [44, 14], which claim to offer a generalist solution, unfortunately experience rapid performance degradation when the images that they are trained on have a different distribution than that of the inference images (also referred to as distribution shift) [42].

Given how frequent the need to generalize out-of-distribution is for the task of segmenting cell bodies, and given how costly and time consuming, if not impractical, the process of collecting and annotating sufficient target data for retraining the model can be, the segmentation software 108 provides a solution in the form of few-shot learning. The segmentation software 108 significantly widens the range of image variability handled by generalist neural network models. Specifically, given a source dataset $D^s$ made of labeled images with which a generalist model could be trained, the learning task is to adapt such a model to generalize well on a target dataset D' which is distributed differently than $D^s$. the segmentation software 108 performs such adaptation based on only a few annotated images, as opposed to hundreds of annotated images needed by traditional approaches. As a result, the amount of time and resources spent on generating the new dataset and to train the model with the new dataset is considerably reduced. In particular, computational resources in terms of time, memory, and power, involved in retraining the model are considerably reduced.

Figure 3:
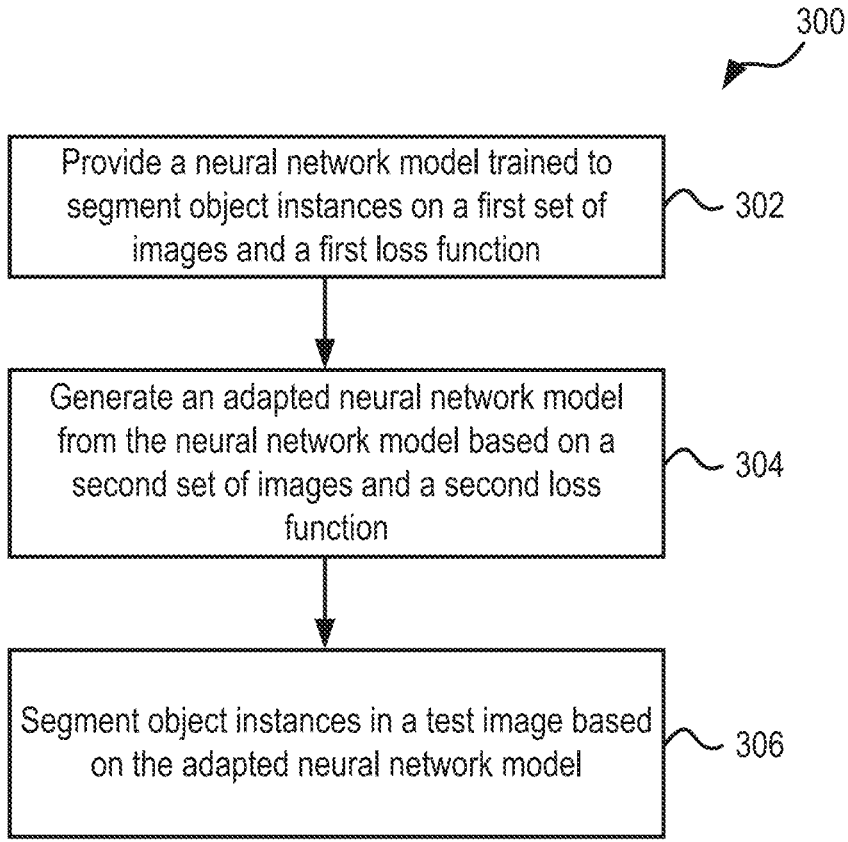
FIG. 3 shows a flow diagram of an example segmentation process.
Figure 4:
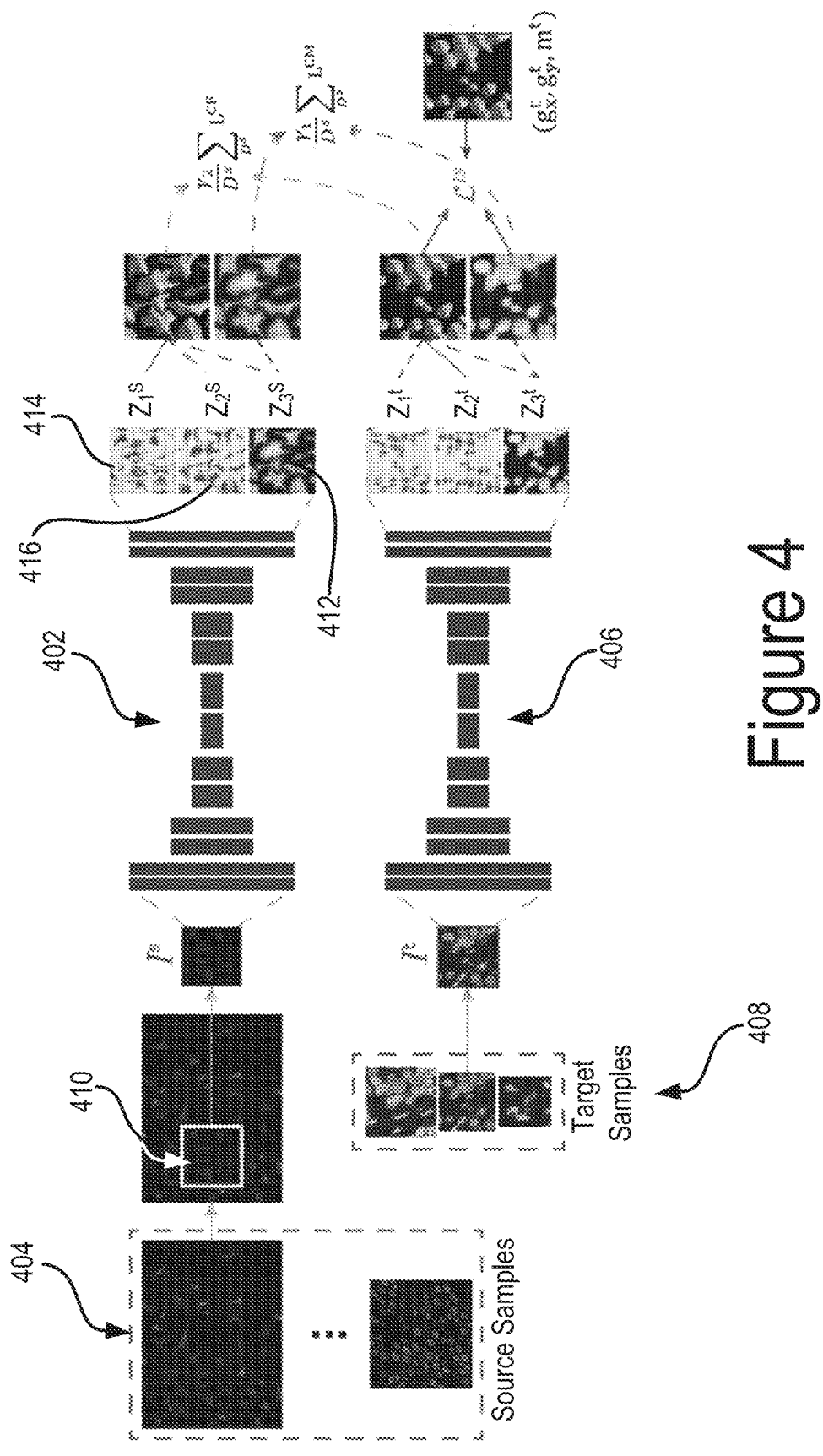
FIG. 4 shows a block diagram of example segmentation network models as per the segmentation process.

FIG. 3 shows a flow diagram of an example segmentation process 300. In particular, the segmentation process 300 can be embodied in the segmentation software 108 stored in non-transitory memory storage 106 of the computing system 100 and can be executed by the processor 102 and/or the co-processor 118. The segmentation process 300 can include providing a neural network model trained to segment object instances on a first set of images and a first lost function (302). FIG. 4 shows a block diagram of an example segmentation network models as per the segmentation process 300. In particular, FIG. 4 shows a neural network model 402 trained to segment cellular instances on a first set of images 404 (also referred to as "source images" or "source samples") and an adapted neural network model 406 trained on a second set of images 408 (also referred to as "target images" or "target samples"). The neural network model 402 can generate a pixel-wise feature where for a pixel in the input image, the pixel-wise feature provides a gradient flow (indicated by $Z_1^s$ and $Z_2^s$) that points towards a center of a cell structure and provides a probability score (indicated by $Z_3^s$) indicating a probability of the pixel belonging to the cell structure.

A network model utilized in Cellpose can be one example network model that can be used as the neural network model 402. Cellpose utilizes a U-Net model with a few modifications. First, the Cellpose architecture uses residual blocks instead of standard convolutional layers. Partially intended to accommodate the approximate doubling of network depth from the residual blocks, the feature maps typically concatenated to each up-sampling layer from the corresponding down-sampling layer are instead added to the inputs directly with no observed loss in performance. A "style" vector is also extracted from the bottleneck via 2-D max-pooling and broadcasted to each up-sampling block. Instead of the standard singular output mask, Cellpose's architecture produces three: one corresponding to a foreground-background prediction (412, FIG. 4) and two contributing to the predicted pixel-wise flow in the x- and y-directions (414 and 416, FIG. 4). The latter two enable individual cell instances to be predicted from the former mask and provide an elegant method for handling cells with a high rate of clustering.

In some instances, prior to training, the flows associated with a given output label can be produced by creating a heat diffusion map as described in the Cellpose technique. The median value of x-coordinates and y-coordinates for pixels in each cell mask can be determined and then considered to be the position of a "heat source." Over the course of multiple iterations, the flows are calculated as the intensity is dispersed to nearby pixels within the mask. Shown in FIG. 4, this generates a topological map where the flow of each pixel within a mask points to another pixel, and each pixel can in this way be followed to the cell center.

In some instances, images from different datasets can be of any arbitrary shape. Using predefined dimensions, patches 410 can be cropped from each image in the first set of images 404. For training and validation, one sample can be randomly selected from each image; for testing, each image can be processed into a series of patches with some level of overlap. These patches can then be recombined by averaging them together in a manner such that pixels near patch boundaries contribute less when overlapped with pixels from the center of a neighboring patch. In some other instances, entire images can be used for both training and testing.

In some instances, to accommodate the varying size of cells both within and across different datasets, input images can be resized prior to patching. In Cellpose, training images can be resized based on a median cell diameter as calculated from the label mask. The segmentation process 300 instead of the median cell diameter, can measure the area of the smallest rectangle which will fit each cell, or in other words, the range of x-coordinates of pixels of a cell multiplied by the range of y-coordinates. Instead of the median value across all cells, the 3rd quartile (75th percentile) value can be considered. This makes it so that cells of varying shapes are more likely to fit within a singular patch—when cells are non-spherical, a median diameter measurement may underestimate the size of the area they span. Additionally, in some instances, the segmentation process 300 may multiply the rescaling factor by a value uniformly selected between 0.75 and 1.25 during training to promote an invariance to cell size by the model. Of course, this is only an example, and that in other instances, no multiplication may be carried out.

In one approach, a separate one-layer model can be used to estimate the resizing factor for testing, as the segmentation process would not have access to labels from the testing distribution. Alternatively, the segmentation process 300 can assume to have test labels during training and can consider target patches to be exemplar samples for the test dataset. The segmentation process 300 can then use the same metric described above on the exemplar samples and resize the target test images accordingly. This technique can reduce the approach to a fully end-to-end framework, slightly decrease training and evaluation time, and require fewer hyperparameters to be tuned.

During evaluation, the segmentation process 300 reconstructs the final output prediction by recombining all of the patches. The flows from each pixel can then be followed in the reverse manner they were generated for the input labels, producing the final instance mask prediction.

Referring again to FIG. 4, given a source image patch I, the neural network model 402 can use a neural network f to produce a dense, pixel-wise feature $Z = f(I)$, where $Z = [Z_1, Z_2, Z_3] \in R^{P \times w \times 3}$. Given the feature $z \approx [z_1, z_2, z_3] \in Z$ for some pixel i, then $z \approx (z_1, z_2)$ can represent a gradient pointing towards the center of the cell structure to which the pixel i belongs. Collectively, $(Z_1, Z_2)$ represent a gradient flow while $z \approx 23$ can represent an unnormalized probability score indicating the probability that the pixel i belongs to a cell structure. The segmentation process 300 can train the network f in a supervised manner with a first loss function reproduced below in Eq. (1):

$$L_i^{IS} = (z_1 - g_x)^2 + (z_2 - g_y)_2 + \vartheta H(m, \sigma(z)) \qquad (1)$$

where, for pixel i, $(g_x, g_y)$ represents the ground-truth gradient label with $l_2$-norm unit and $m \in \{0,1\}$ is the binary mask label indicating the absence/presence of a cell structure, $\sigma(z) \approx 1/(1 + e^{-z})$, H represents the binary cross-entropy, and $\vartheta$ is a hyperparameter set to a predetermined value between about 0.01 and 0.1, or for example to 0.04. The pixel-wise loss contributions can then be aggregated into a final loss $L^{IS} = \Sigma L_i^{IS}$ for the image I.

Given the feature Z, the cell instance segmentation head g can produce a mask $Y = g(Z)$, where for a pixel i, the predicted label y is a number in the set {0, 1, . . . , N}, with N being the total number of cell instances that have the same label, and y=0 indicates absence of a cell instance. The implementation of g is described in further detail in Cellpose [44].

The segmentation process 300 having trained the neural network model 402 on the neural network model 402 on the first set of images 404 and on the first loss function represented above in Eq. (1) can generate an adapted model. In particular, the segmentation process 300 can generate an adapted neural network model 406 (FIG. 4) from the neural network model 402 (FIG. 4) based on a second set of images 408 and a second loss function (304).

With regard to the adapted neural network model 406, if an image I were drawn from the same distribution $D^s$ from which the first set of images 404 were drawn, then for a target pixel i, with a label $(g_x{}^t, g_x{}^t, m^t)$, its feature ze should be very close to the feature of the pixels in the source dataset that have the same label. However, when the image I is instead drawn from a distribution $D^t$ that is different from the distribution $D^s$, a domain shift occurs, and the feature $z^t$ then may not be close to the feature of the pixels in the source dataset that have the same label. This can lead to performance deterioration of the cell instance segmentation process when one utilizes the first neural network f on I, followed by the instance segmentation head g. Therefore, provided that the labels of some target image pixels are available, the segmentation process 300 can reverse the effects of domain shift by adapting the neural network f to generalize well on the target dataset $D^t$. Given the distinct predictive nature (continuous v. discrete) of the gradient flow features $z \approx (z_1, z_2)$ from the mask feature $z \approx z_3$, the adaptation losses for each case can be determined separately. The overall loss function can include at least a contrastive flow loss component and a contrastive mask loss component, each of which is discussed below.

Contrastive Flow Loss

The segmentation process 300 can determine a contrastive flow loss component that can align gradient flows of pixels in the second set of images with gradient flows of pixels in the first set of images having the same label y as the pixels in the second set of images. The contrastive flow loss component attempts to pull the gradient flows of pixels in the second set of images towards the gradient flows of pixels in the first set of images that have the same label y as the pixels in the second set of images and push apart from gradient flows of pixels in the first set of images that have different labels. The segmentation process 300 can identify a positive pixel from the first set of images with a binary label $m_+{}^s = m^t = 1$, and with gradient flow features $z_+{}^s$ that best matches the label $(g_x{}^t, g_x{}^t)$ based on a similarity measure. One example of a similarity measure is a cosine similarity, but other known similarity measures could also be used. The cosine similarity can be represented by $s(u, v) \approx u^T v / \|u\| \|v\|$, where $\|\cdot\|$ denotes $l_2$-norm.

The segmentation process 300 can include identifying a set of negative pixels in the first set of images that have the same label as the first pixel in the second set of images. In particular, the segmentation process 300 can include identifying a set of negative source gradient flow features $N_i = \{z_-{}^s | s(z_+{}^s, z_-{}^s) < \delta, m_-{}^s = 1\}$, where $\delta$ is a suitable constant hyperparameter threshold. The segmentation process 300 can further include determining the contrastive loss function for pixel i that attempts to pull the positive pair $(z^t, z_+{}^s)$ closer, while pushing apart every negative pair $(z^t, z_-{}^s)$ for $z_-{}^s \in N_i$. The contrastive loss flow component can be expressed as in Eq. (2):

$$L_i^{CF} = -\log \frac{\exp(s(z^t, z_+^S)/\tau)}{\exp(s(z^t, z_+^s)/\tau) + \sum_{z_-^s \in N_i} \exp(s(z^t, z_-^s)/\tau)} \quad (2)$$

where $\tau$ denotes a hyperparameter and can be any positive number and can be set to, for example, 0.1 or other powers or 10. Note that Eq. (2) addresses only the directional alignment of the gradient flow features, which is used by the segmentation head g for assigning pixels to instances. The gradient bead g may not utilize the gradient magnitude. However, as discussed further below, Eq. (1) may also be applied on the second set of images, which can make it more appropriate for the gradients to have unit magnitude.

The set $N_i$ of negative source gradient flow features can be composed by selecting the features closest to the positive pixel feature $z_+{}^s$. This hard-mining strategy can alleviate the need for considering large amounts of negative pixel features, because it makes them less informative. This can lead to faster training, and better model performance [48]. In some instances, for a given pixel from the second set of images, the positive feature and the set of negative features $|N_i|$ from a single image belonging to the first set of images. In some instances, the segmentation process 300 can include setting $|N_i|$ to be the same for every pixel from the second set of images, and generally, there can be sufficient number of negative features such that the similarity between $z_+{}^s$ and each negative feature is approximately equal to $\delta$. Thus, the $N_i$ features can be roughly equally divided between those at $\cos^{-1} \delta$ radians counter-clockwise from $z_+{}^s$.

Given an image patch from the second set of images and an image patch from the first set of images, the segmentation process 300 can include determining a the contrastive flow loss function by aggregating all the components associated with the pixels in the image patch from with the second set of images that belong to the cell structure, so they have a label $m^t = 1$. This set of pixels can be denoted by M. The contrastive flow loss function can then be expressed as in Eq. (3) below:

$$L^{CF} = \frac{1}{|M|} \sum_M L_i^{CF} \quad (3)$$

Contrastive Mask Loss

The segmentation process 300 can include determining the contrastive mask loss function to align probability scores of the pixels in the second set of images with probability scores of pixels in the first set of images having the same label as the pixels in the second set of images. Referring to Eq. (2), when $\tau \to +\infty$, Eq. (2) converges to:

$$\lim_{\tau \to \infty} L_i^{CF} = -s(z^t, z_+^s) + \lambda \sum_{z_-^s \in N_i} s(z^t, z_-^s) \quad (4)$$

where $\lambda$ is a hyperparameter. As it is desirable to align the unnormalized probability score (also referred to as "binary classification score") $z^t$ with the scores of the pixels in the first set of images having the same label, the segmentation process 300 can include deriving the contrastive mask loss component.

When Eq. (4) is optimized, the first term aims at maximizing similarity, i.e., the similarity between $z^t$ and the unnormalized score of the pixel of an image in the first set of images $z_+^s$ with label $m^s=m^t$. The first term can be replaced with an alignment term that is based on distance, leading to a squared loss:

$$d(z^t, z_+^s) = \frac{1}{2}(z^t, z_+^s)^2 \qquad (5)$$

The second term of Eq. (4) aims at minimizing similarity, i.e., minimizing similarity between $z^t$ and the unnormalized score of pixels in the first set of images with label different than $m^t$. This would lead to separation between scores with opposite labels. Given one such pixel with score $z_-^s$, the similarity with $z^t$ can be measured with the following Eq. (6):

$$k(z^t, z_-^s) = \frac{1}{2}\max(0, m - |z^t, z_-^s|)^2 \qquad (6)$$

where m is a margin, and the loss provides gradient contributions when $z^t$ is within margin m of $z_-^s$.

Given an image patch from the second set of images and an image patch from the first set of images in a minibatch, the losses expressed in Eq. (5) and Eq. (6) can be aggregated. For example, let P be a set of positive pairs of scores $(z^t, z_+^s)$ corresponding to pixels in the same relative positions in the image patches from the first and the second set of images, and with the same label, i.e., $m^s=m^t$; and let N be the set of negative pairs of scores $(z^t, z_-^s)$ corresponding to pixels in the same relative positions in the image patches from the first and the second set of images but with different label, i.e., $m^s \neq m^t$. Then the loss for a pair of scores is expressed in Eq. (7) below:

$$L^{CM} = \frac{1}{|P|}\sum_P d(z^t, z_+^s) + \lambda\frac{1}{|N|}\sum_N k(z^t, z_-^s) \qquad (7)$$

Figure 5:
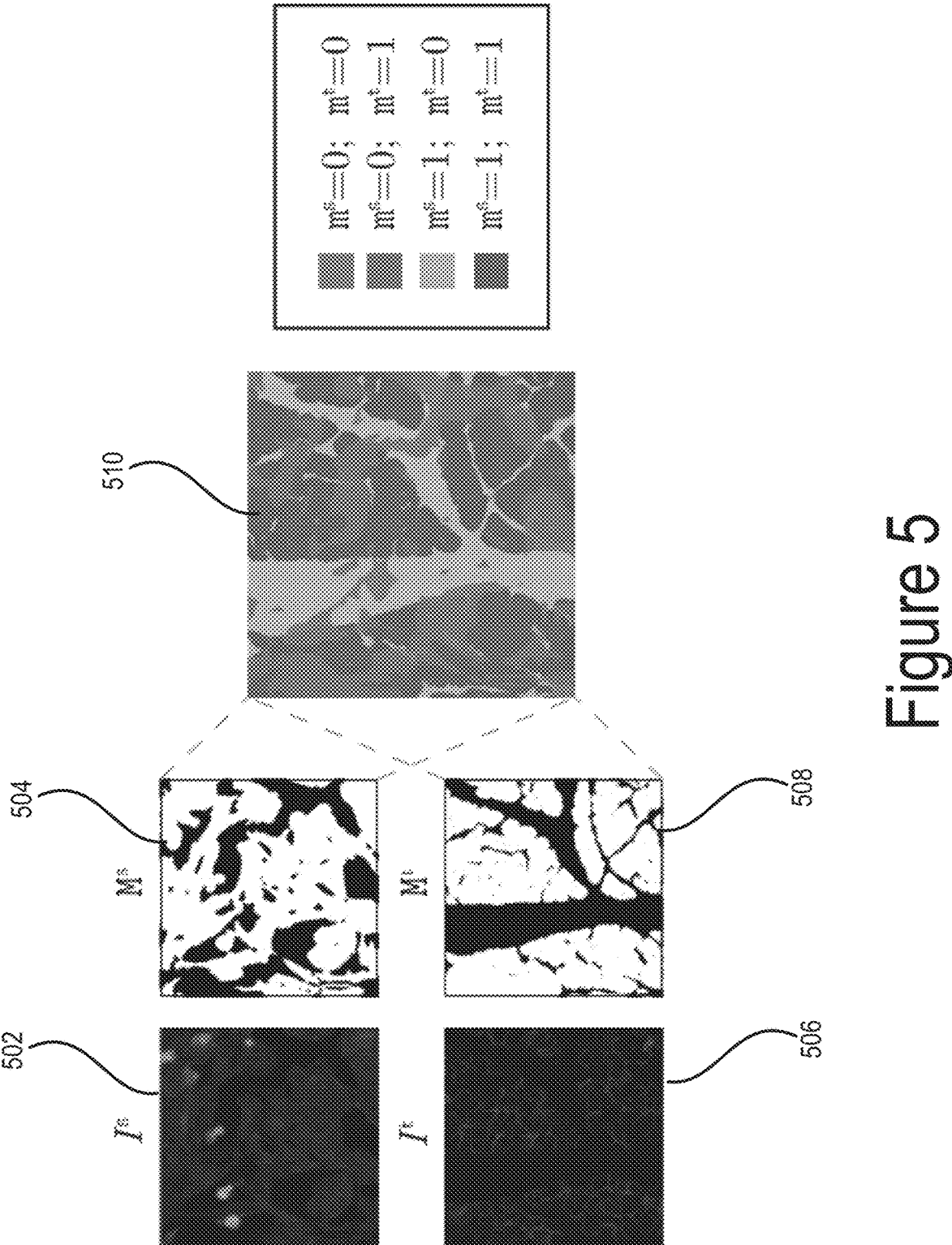
FIG. 5 shows an example representation of the contrastive mask loss component for a given pair of image patches.

Eq. (7) can be referred to as the contrastive mask loss component. Each term of the loss component is normalized with respect to the aera covered by the positive and the negative pairs respectively. Also, the formation of the sets P and N is based on the comparison of the mask labels of the image patches from the first and the second set of images. FIG. 5 shows an example representation of the contrastive mask loss component for a given pair of image patches. In particular, a first image patch 502 represents an image patch from the first set of images and the second image patch 506 represents an image patch from the second set of images. A first mask 504 represents a mask corresponding to the first image patch 502, while the second mask 508 corresponds to the mask of the second image patch 506. The overlap patch 510 represents an overlap of the first mask 504 and the second mask 508. The overlap patch 510 can be used to determine the set P of positive pairs of scores $(z^t, z_+^s)$ corresponding to pixels in the same relative positions in the image patches from the first and the second set of images, and with the same label, i.e., $m^s=m^t$; and determine the set N of negative pairs of scores $(z^t, z_-^s)$ corresponding to pixels in the same relative positions in the image patches from the first and the second set of images but with different label, i.e., $m^s \neq m^t$. Using the technique shown in FIG. 5 is not necessary to determine the sets P and N, but can be convenient because it allows forming sufficiently large sets P and N, while implementing Eq. (7) can be easier and faster if the parallel architecture of GPUs (e.g., the co-processor 118, FIG. 1) can be utilized.

Few-Shot Adaptation

Assuming that $D_K^t$ is a subset of the second set of images $D^t$ with K labeled samples, the K-shot adaptation learning aims at minimizing the loss:

$$L^{ISA} = \sum_{D_K^t}\left(L^{IS} + \frac{\gamma_1}{|D^s|}\sum_{D^s}L^{CM} + \frac{\gamma_1}{|D^s|}\sum_{D^s}L^{CF}\right) \qquad (8)$$

The training assumes that the generalist model (i.e., the neural network model 402, FIG. 4) has already been pretrained. As an example, where the neural network model is the Cellpose model, the model can be pretrained for 500 epochs. However, the number of epochs is only a nonlimiting example, and that the actual number can be different for different implementations. The segmentation process 300 can include training the adapted neural network model 406 with the second loss function expressed in Eq. (8) for several epochs where in each epoch, parameters of the neural network are adjusted. These parameters can include, for example, weights associated with the artificial neurons of the neural network. In some instances, in each run or epoch images from the first set of images 404 can be randomly paired with one of K second set of images without replacement. Pairing the second set of images with 1/K-th of the first set of images in every epoch ensures that even a 1-shot adaptation can operate a significant pull of the model towards the target distribution. The adapted neural network model 406 can be fine-tuned on DE with LISA for a few epochs, such as for example at least one epoch and at most 5 epochs. However, the upper limit to the number of epochs can vary, such as example up to 10 epochs, or up to 15 epochs, or up to 20 epochs. In some instances, the number of epochs can be no more than the number of epochs on which the neural network model 402 was pretrained.

In some instances, for a single shot adaptation, a target exemplar cell can be selected such that its size and the relative density of cells nearby is representative of the average scenario across the target dataset (or the second set of images 408). If K>1 cells are selected, they would more likely capture the variability of the dataset and lead to the K-shot scenario. For a given cell sample, the cell can be measured, giving the value $m_c$ in pixel units. The one-shot patch can be center-cropped around the cell and has size $\beta_{max}m_cw/m_n$, where $m_n$ is the nominal cell size, w is the size of the patch passed in to the model, and $\beta_{max}$ is the largest scaling factor admissible.

The adapted neural network model 406 resulting from the retraining with the second set of images and the second loss function can be utilized for cellular segmentation of other image sets. The segmentation process 300 can further include segmenting object instances in a test image based on the adapted neural network model (306). The segmentation is not unlike using the original model, except the original model (the neural network model 402) is replaced with the adapted neural network model 406, which has been adapted using k-shot adaptation based on the second set of images and the second loss function.

Results

The following describes experimental results based on the adaptation model discussed herein. The experimental results presented are examples only and are not necessarily presented to limit the scope of the claims. The neural network model 402 can be pretrained with the "generalized" dataset of [44] as source data $D^s$. The neural network model 402 can be adapted based on the segmentation process 300 discussed above. With regard to training data, commonly known data splitting guidelines can be followed to ensure fair comparison. For example, K sample patches and be drawn to form the subset $D_K^t$ from a training split of the dataset of the target distribution, while the testing split of the target distribution dataset can be used as the unlabeled portion of the target dataset $D^t$. Stochastic gradient descent with initial learning rate of $10^{-2}$, momentum of 0.9, weight decay of $10^{-5}$, and batch size of 2 can be selected. For the first five epochs, the annotated shots. Beyond this, results begin to exhibit diminished returns. So, unless otherwise specified, other results have been obtained with a 3-shot adaptation, given the balance it gives between performance and annotation needs.

TissueNet

CellTranspose was also evaluated on TissueNet [14], a dataset developed alongside a generalist method called Mesmer. TissueNet is comprised of samples from various imaging platforms and tissue types, providing a wide-spanning array of cellular images. In [14] one set of experiments split TissueNet into subsets of the four most common imaging types, each of which was further divided into different tissue types. Similarly, four other subsets were composed of the four most common tissue types, each being further split into the imaging types that make up the samples for that tissue type.

TABLE 1

| TissueNet dataset: F-1 score from generalist approaches and CellTranspose | | | | | | | | |
|---|---|---|---|---|---|---|---|---|
| TissueNet | Platform-specific | | | | Tissue-specific | | | |
| Results | CODEX | CyCIF | MIBI | Vectra | Breast | GI | Imm | Panc. |
| Cellpose | 0.785 | 0.548 | 0.479 | 0.609 | 0.67 | 0.523 | 0.35 | 0.797 |
| Mesmer | 0.88 | 0.8 | 0.76 | 0.72 | 0.74 | 0.82 | 0.82 | 0.92 |
| CellTranspose | 0.940 | 0.94 | 0.932 | 0.918 | 0.911 | 0.906 | 0.934 | 0.955 |
| Cellpose-UB | 0.962 | 0.967 | 0.945 | 0.96 | 0.95 | 0.940 | 0.953 | 0.958 | learning rate decreases by a factor of 10 each epoch, and is kept constant for the remaining five. The process considers square patches with side length $h=w=112$, uses a minimum overlap of 84 during evaluation, and enforces a nominal cell size $m_n=30$. Additional hyperparameters can be set as: $|Ni|=20$, $\tau=0.1$, $m=10$, $\lambda=1$, $\gamma 1=0.05$, $\gamma 2=2$, and $\delta=0.05$. Because the source dataset used is always significantly larger than the target data, adaptation takes roughly the same amount of time regardless of the size of K or the target data to which the model is adapted. Using a singular NVIDIA TITAN Xp GPU as the co-processor 118, adaptation takes approximately 5 minutes to complete for each experiment.

Broad Bioimage Benchmark Collection—006

The segmentation process 300 was evaluated on the target dataset BBBC006 [29], hosted by the Broad Institute. This dataset is composed of human U2OS cells which are fairly homogeneous and easy to segment in ideal settings. However, the same tissue samples have been imaged with different focus settings, generating different images, which allows observation of the effect of the associated covariate shift on generalist and the approaches discussed herein. Images taken with five focal planes were considered, specifically at $z\approx00$, 08, 16, 24, and 32. The optimal focal plane was determined to be at $z\approx16$. Qualitative segmentation results show improved accuracy in segmentation with the adapted neural network model as opposed to the pretrained neural network model. As the data moves away from the optimal focal plane the generalist Cellpose model experiences greater performance deterioration than CellTranspose (i.e., the segmentation process 300 discussed above).

Figure 6:
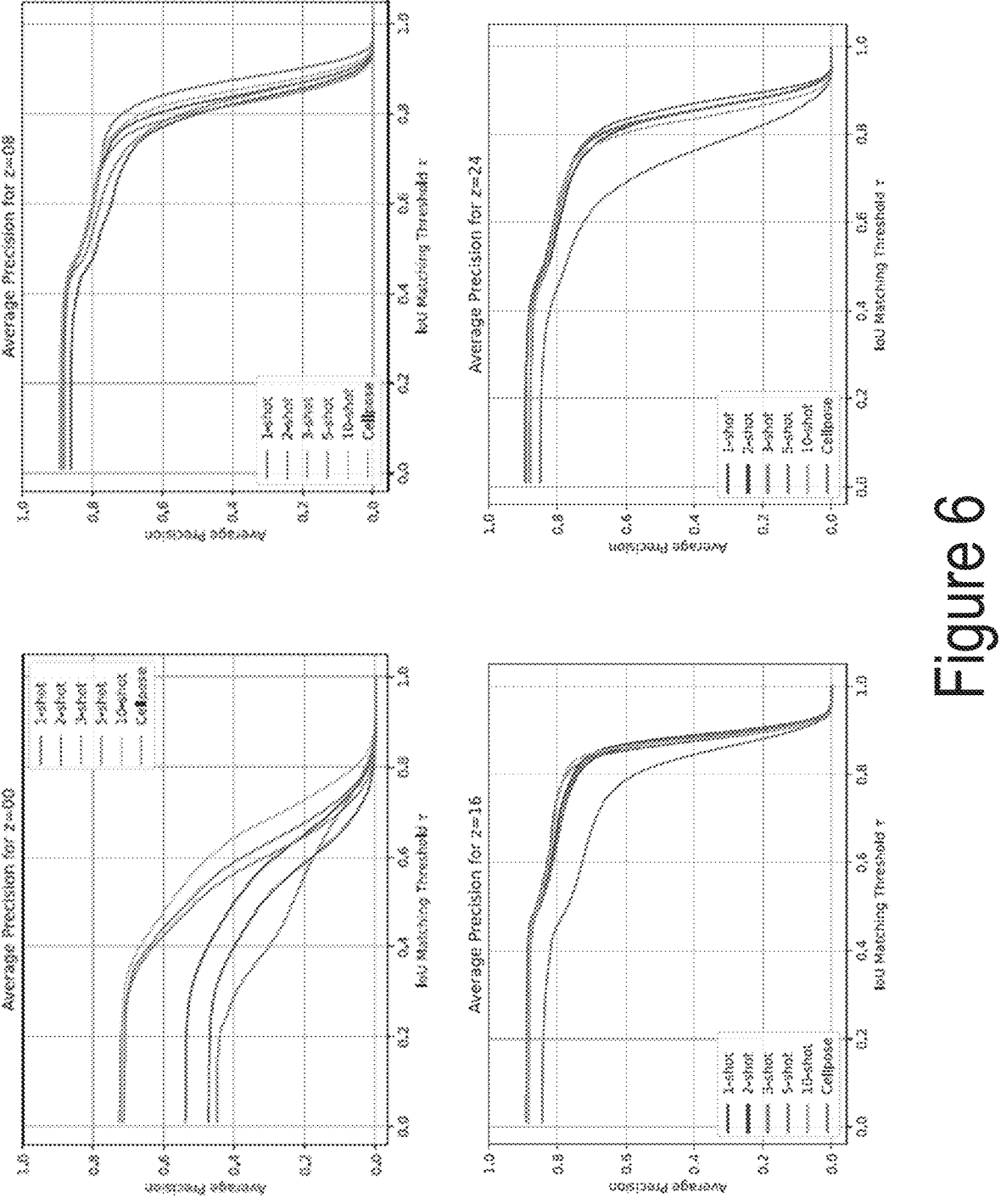
FIG. 6 plots the average precision (AP) against the intersection over union (IoU) for the different focal settings.
Figure 6:
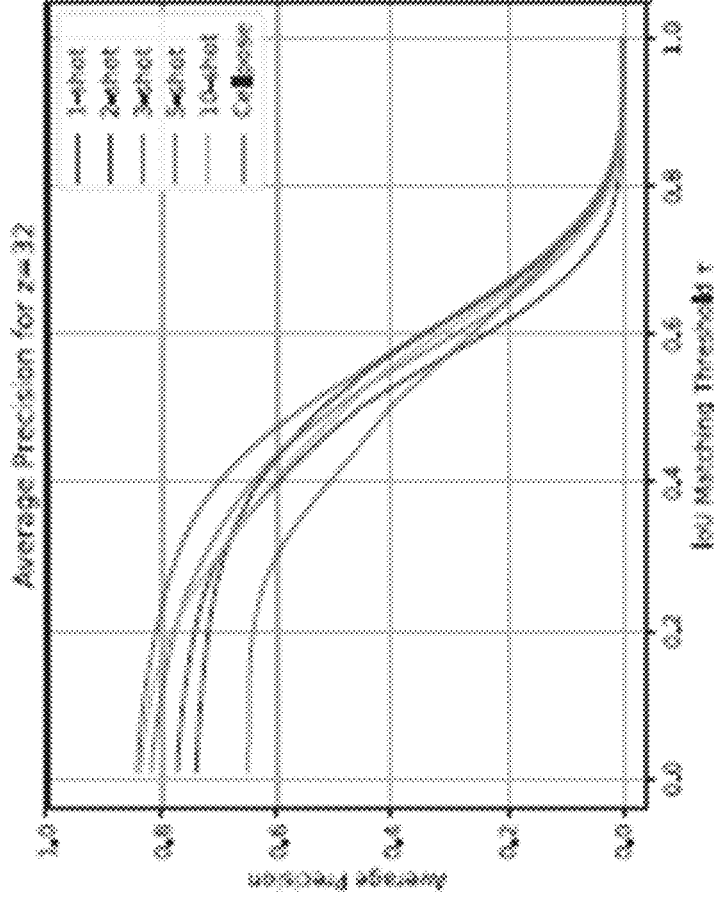

CellTranspose was also tested with different numbers $K=1$, 2, 3, 5, 10, of few-shot adaptation. FIG. 6 plots the average precision (AP) against the intersection over union (IoU) for the different focal settings. CellTranspose consistently achieves high performance levels with as few as three Table I shows the F-1 scores on these eight data splits, computed for the generalist Cellpose, Mesmer trained on each of the splits, and CellTranspose 3-shot adapted to each of the splits. Again, CellTranspose consistently shows improved performance. Since CellTranspose essentially adapts Cellpose to the target domain, we can interpret it as a lower bound of performance. On the other hand, Cellpose was also retrained with each target training dataset, obtaining what could be interpreted as an upper bound for CellTranspose, which is indicated as Cellpose-UB.

Triple Negative Breast Cancer

Cellular segmentation of hematoxylin and eosin-stained (H&E) images can be challenging. This is in part due to the fact that multiple cell types often appear within an individual sample, in addition to the high variability of the background. The Triple Negative Breast Cancer (TNBC) dataset [34], gathered by the Curie Institute, is comprised of 50 images obtained from 11 distinct tissue types, furthering the inherent difficulty of the dataset. CellTranspose was compared with the top-performing unsupervised domain adaptive cellular instance segmentation approach, CyC-PDAM [26]. This is the closest approach to CellTranspose in terms of problem settings and data, since the only other supervised domain adaptive instance segmentation approaches [61, 52] were tuned to very specific and different applications. Following the lead of CyC-PDAM, the experiment diverted from the protocol used above and pretrained CellTranspose on the BBBC039 dataset. The experiment then adapted the model with 3, 5, and 10 shot samples selected from the target dataset of 40 images and 8 tissue types from TNBC. Each model was then tested on the 10 images from the remaining 3 tissue types. Results, using the same metrics as CyC-PDAM, are shown in Table 2.

TABLE 2

TNBC Dataset. Comparison between top supervised approaches and
CellTranspose.

| BBBC039→ TNBC | AJI | Pixel-F1 | Object-F1 |
|---|---|---|---|
| Cellpose | 0.3815 ± 0.0794 | 0.5829 ± 0.0689 | 0.5408 ± 0.1124 |
| CyC-PDAM[26] | 0.5672 ± 0.0646 | 0.7593 ± 0.0566 | 0.7478 ± 0.0417 |
| CellTranspose 3-shot | 0.4916 ± 0.0771 | 0.6702 ± 0.0710 | 0.7092 ± 0.0818 |
| CellTranspose 5-shot | 0.5693 ± 0.0576 | 0.7377 ± 0.0431 | 0.7825 ± 0.0625 |
| CellTranspose 10-shot | 0.5906 ± 0.0617 | 0.7568 ± 0.0493 | 0.7879 ± 0.0687 |
| Cellpose-UB | 0.5498 ± 0.0860 | 0.7216 ± 0.0704 | 0.7760 ± 0.0640 |

Best results are in bold, and second-best results are underlined.

It can be noted that a 5-shot adaptation leads to performance metrics comparable with those of CyC-PDAM, that has used all the training target data available to adapt the model in an unsupervised manner. Note that the settings of this experiment is still different and disadvantageous from the protocol for which CellTranspose was designed, because the target testing data distribution is different from the target training data distribution. The experiment also tested Cellpose-UB in this settings, which appears to be affected more than CellTranspose by the domain shift still present in the evaluation protocol.

3D Segmentation

As biological applications often involve the analysis of 3-D data, following the approach in [44], the experiments extend CellTranspose to operate in 3-D, named CellTranspose3D, by making adaptation and combining the predictions along the xy, yz, and zx volume sections. The experiments also test this approach on two 3-D datasets. The BBBC024 is composed of synthetic annotated cells from the Broad Institute. The Worm dataset is a series of nuclei images from larval stage C. elegans. Similar to the 2-D experiments, only three 2-D sample patches, taken from the XY-plane from volumes in each training set, are used as target data for the model. StarDist-3D [51] and Cellpose3D-UB were trained and tested on Worm, and Cellpose3D-UB on BBBC024 also, and serve here as upper bounds. Table 3 shows the average precision results, highlighting the improvement of CellTranspose3D over the generalist Cellpose3D.

TABLE 3

3D datasets. Average Precision at IoU threshold 0.5.

| 3-D Results | Worm | BBBC024 |
|---|---|---|
| Cellpose3D | 0.575 | 0.822 |
| CellTranspose3D | 0.648 | 0.994 |
| Cellpose3D-UB | 0.675 | 10 |
| StarDist-3D | 0.765 | — |

Ablation Study

Table 4 shows ablation results computed on the BBBC006 dataset with z=00 and 3-shot adaptation. The addition of both contrastive losses improves the overall AP by more than 15%. However, the removal of only one adaptation loss tends to decrease the performance to below that of removing both, which follows the same training scheme discussed above in relation to FIG. 3, but without either adaptation loss. This indicates that the flow and mask losses are intrinsically tied to one another, which is consistent with the fact that weights are shared between both outputs until the final layer.

TABLE 4

Ablation results on BBBC006.
AP is calculated for an IoU threshold of 0.5.

| Ablation Results | $AP_{50}$ |
|---|---|
| CellTranspose | 0.509 |
| No Contrastive Flow Loss | 0.414 |
| No Contrastive Mask Loss | 0.434 |
| No Adaptation Losses | 0.441 |
| No Adaptation Losses & No cell size | 0.390 |
| Cellpose | 0.233 |

Additionally, the cell size calculation method seems to play an important role in accurate segmentation. Cellpose computes the cell size based upon the number of pixels corresponding to a particular cell, but non-spherical cells have the potential to provide a similar diameter while spanning a much larger area. Thus, a more robust cell size calculation could be based on computing the total rectangular area enclosing a cell, which is how it is done in CellTranspose. The second row from bottom in Table 4 shows that when this second strategy is replaced with the one used by Cellpose, performance further deteriorates.

It should be noted that while the above approaches were described in relation to cell segmentation, the systems and methods described herein can be equally applied to segmentation of other objects in images as well. In particular, the problem of domain shift can occur in segmentation of images of other objects, such as for example, people, livestock/animals, vehicles, etc., the images of which may have been captured in conditions that are different from the condition in which the source or training images were captured. One specific and non-limiting example can include counting livestock from overhead target images that have been captured in conditions that are different from the conditions under which the training images were captured. In such instances, the domain shift of the target images may degrade the accuracy of the neural network trained on the training images. The techniques discussed above can be equally applied to counting livestock where the neural network can be adapted to the distribution of the target images without the need for retraining the neural network with multitude of target images. A person skilled in the art can appreciate that the techniques discussed herein are agnostic to the objects being segmented, and that the results described herein, albeit focused on cellular segmentation, can indicate applicability in segmentation of any objects in images.

References: All cited references, patent or literature, are incorporated by reference in their entirety. The examples disclosed herein are illustrative and not limiting in nature. Details disclosed with respect to the methods described herein included in one example or embodiment may be applied to other examples and embodiments. Any aspect of the present disclosure that has been described herein may be disclaimed, i.e., exclude from the claimed subject matter whether by proviso or otherwise.

[1] Mathilde Bateson, Hoel Kervadec, Jose Dolz, Herv'e Lombaert, and Ismail Ben Ayed. Constrained domain adaptation for segmentation. In Medical Image Computing and Computer Assisted Intervention-MICCAI 2019, pages 326-334. Springer International Publishing, 2019.

[2] R'oger Bermu dez-Chac'on, Pablo Ma'rquez-Neila, Mathieu Salzmann, and Pascal Fua. A domain-adaptive two-stream U-Net for electron microscopy image segmentation. In 2018 IEEE 15th International Symposium on Biomedical Imaging (ISBI 2018), pages 400-404, April 2018.

[3] S. Beucher, Use of watersheds in contour detection. Proceedings of the International Workshop on Image Processing, 1979.

[4] Tim-Oliver Buchholz, Mangal Prakash, Deborah Schmidt, Alexander Krull, and Florian Jug. DenoiSeg: Joint denoising and segmentation. In Computer Vision-ECCV 2020 Workshops, pages 324-337. Springer International Publishing, 2020.

[5] Z. Cao, G. Hidalgo Martinez, T. Simon, S. Wei, and Y. A. Sheikh. Openpose: Realtime multi-person 2d pose estimation using part affinity fields. IEEE Trans-actions on Pattern Analysis and Machine Intelligence, 2019.

[6] Mathilde Caron, Ishan Misra, Julien Mairal, Priya Goyal, Piotr Bojanowski, and Armand Joulin. Unsupervised learning of visual features by contrasting cluster assignments. Adv. Neural Inf. Process. Syst., 33:9912-9924, 2020.

[7] Cheng Chen, Qi Dou, Hao Chen, Jing Qin, and Pheng-Ann Heng. Synergistic image and feature adaptation: Towards Cross-Modality domain adaptation for medical image segmentation. AAAI, 33 (01): 865-872, July 2019.

[8] Ting Chen, Simon Kornblith, Mohammad Norouzi, and Geoffrey Hinton. A simple framework for contrastive learning of visual representations. In Hal Daum'e Iii and Aarti Singh, editors, Proceedings of the 37th International Conference on Machine Learning, volume 119 of Proceedings of Machine Learning Research, pages 1597-1607. PMLR, 2020.

[9] Qi Dou, Cheng Ouyang, Cheng Chen, Hao Chen, Ben Glocker, Xiahai Zhuang, and Pheng-Ann Heng. PnP-AdaNet: Plug-and-Play adversarial domain adaptation network at unpaired Cross-Modality cardiac segmentation. IEEE Access, 7:99065-99076, 2019.

[10] Mohsen Ghafoorian, Alireza Mehrtash, Tina Kapur, Nico Karssemeijer, Elena Marchiori, Mehran Pesteie, Charles R. G Guttmann, Frank-Erik de Leeuw, Clare M Tempany, Bram van Ginneken, Andriy Fedorov, Pu-rang Abolmaesumi, Bram Platel, and William M Wells. Transfer learning for domain adaptation in MRI: Application in brain lesion segmentation. In Medical Image Computing and Computer Assisted Intervention—MICCAI 2017, pages 516-524. Springer International Publishing, 2017.

[11] Amir Gholami, Shashank Subramanian, Varun Shenoy, Naveen Himthani, Xiangyu Yue, Sicheng Zhao, Peter Jin, George Biros, and Kurt Keutzer. A novel domain adaptation framework for medical image segmentation. In Brainlesion: Glioma, Multiple Sclerosis, Stroke and Traumatic Brain Injuries, pages 289-298. Springer International Publishing, 2019.

[12] Michael Goetz, Christian Weber, Franciszek Binczyk, Joanna Polanska, Rafal Tarnawski, Barbara Bobek-Billewicz, Ullrich Koethe, Jens Kleesiek, Bram Stieltjes, and Klaus H Maier-Hein. DALSA: Domain adaptation for supervised learning from sparsely annotated MR images. IEEE Trans. Med. Imaging, 35 (1): 184-196, January 2016.

[13] Ian Goodfellow, Yoshua Bengio, Aaron Courville, and Yoshua Bengio. Deep learning, volume 1. MIT press Cambridge, 2016.

[14] Noah F Greenwald, Geneva Miller, Erick Moen, Alex Kong, Adam Kagel, Thomas Dougherty, Christine Camacho Fullaway, Brianna J McIntosh, Ke Xuan Leow, Morgan Sarah Schwartz, Cole Pavelchek, Sunny Cui, Isabella Camplisson, Omer BarTal, Jaiveer Singh, Mara Fong, Gautam Chaudhry, Zion Abraham, Jackson Moseley, Shiri Warshawsky, Erin Soon, Shirley Greenbaum, Tyler Risom, Travis Hollmann, Sean C Bendall, Lecat Keren, William Graf, Michael Angelo, and David Van Valen. Whole-cell segmentation of tissue images with human-level performance using large-scale data annotation and deep learning. Nat. Biotech-no 1., November 2021.

[15] Hao Guan and Mingxia Liu, Domain adaptation for medical image analysis: A survey. IEEE Trans. Biomed. Eng., 69 (3): 1173-1185 March 2022.

[16] R Hadsell, S Chopra, and Y LeCun. Dimensionality reduction by learning an invariant mapping. In 2006 IEEE Computer Society Conference on Computer Vision and Pattern Recognition (CVPR'06), volume 2, pages 1735-1742 June 2006.

[17] R Hadsell, S Chopra, and Y LeCun. Dimensionality reduction by learning an invariant mapping. In 2006 IEEE Computer Society Conference on Computer Vision and Pattern Recognition (CVPR'06), volume 2, pages 1735-1742 June 2006.

[18] Kaiming He, Haoqi Fan, Yuxin Wu, Saining Xie, and Ross Girshick. Momentum contrast for unsupervised visual representation learning. In 2020 IEEE/CVF Conference on Computer Vision and Pattern Recognition (CVPR). IEEE, June 2020.

[19] Mehran Javanmardi and Tolga Tasdizen. Domain adaptation for biomedical image segmentation using adversarial training. In 2018 IEEE 15th International Symposium on Biomedical Imaging (ISBI 2018), pages 554-558, April 2018.

[20] Jue Jiang, Yu-Chi Hu, Neelam Tyagi, Pengpeng Zhang, Andreas Rimner, Gig S Mageras, Joseph ODeasy, and Harini Veeraraghavan. Tumor-Aware, adversarial domain adaptation from CT to MRI for lung cancer segmentation. In Medical Image Computing and Computer Assisted Intervention-MICCAI 2018, pages 777-785. Springer International Publishing, 2018.

[21] Jiang Jue, Hu Jason, Tyagi Neelam, Rimner Andreas, Berry L Sean, Deasy O Joseph, and Veeraraghavan Harini. Integrating cross-modality hallucinated MRI with CT to aid mediastinal lung tumor segmentation. In Medical Image Computing and Computer Assisted Intervention—MICCAI 2019, pages 221-229. Springer International Publishing, 2019.

[22] Konstantinos Kamnitsas, Christian Baumgartner, Christian Ledig, Virginia Newcombe, Joanna Simpson, Andrew Kane, David Menon, Aditya Nori, Antonio Criminisi, Daniel Rueckert, and Ben Glocker. Unsupervised domain adaptation in brain lesion segmentation with adversarial networks. In Information Processing in Medical Imaging, pages 597-609. Springer International Publishing, 2017.

[23] Neerav Karani, Krishna Chaitanya, Christian Baumgartner, and Ender Konukoglu. A lifelong learning approach to brain MR segmentation across scanners and protocols. In Medical Image Computing and Computer Assisted Intervention—MICCAI 2018, pages 476-484. Springer International Publishing, 2018.

[24] Chaoqun Li, Yitian Zhou, Tangqi Shi, Yenan Wu, Meng Yang, and Zhongyu Li. Unsupervised domain adaptation for the histopathological cell segmentation through Self-Ensembling. In Manfredo Atzori, Nikolay Burlutskiy, Francesco Ciompi, Zhang Li, Fayyaz Minhas, Henning Muller, Tingying Peng, Nasir Rajpoot, Ben Torben-Nielsen, Jeroen van der Laak, Mitko Veta, Yinyin Yuan, and Inti Zlobec, editors, Proceedings of the MICCAI Workshop on Computational Pathology, volume 156 of Proceedings of Machine Learning Re-search, pages 151-158. PMLR, September 2021.

[25] Shuang Li, Binhui Xie, Bin Zang, Chi Harold Liu, Xin-jing Cheng, Ruigang Yang, and Guoren Wang. Semantic distribution-aware contrastive adaptation for semantic segmentation. CoRR, abs/2105.05013, May 2021.

[26] Dongnan Liu, Donghao Zhang, Yang Song, Fan Zhang, Lauren ODonnell, Heng Huang, Mei Chen, and Weidong Cai. Unsupervised instance segmentation in microscopy images via panoptic domain adaptation and task re-weighting. In 2020 IEEE/CVF Conference on Computer Vision and Pattern Recognition (CVPR). IEEE, June 2020.

[27] Dongnan Liu, Dongbao Zhang, Yang Song, Fan Zhang, Lauren O'Donnell, Heng Huang, Mei Chen, and Weidong Cai. PDAM: A Panoptic-Level feature alignment framework for unsupervised domain adaptive instance segmentation in microscopy images. IEEE Trans. Med. Imaging, 40 (1): 154-165, January 2021.

[28] Weizhe Liu, David Ferstl, Samuel Schulter, Lukas Zebedin, Pascal Fua, and Christian Leistner. Domain adaptation for semantic segmentation via Patch-Wise contrastive learning. CoRR, abs/2104.11056, April 2021.

[29] Vebjom Ljosa, Katherine L Sokolnicki, and Anne E Carpenter. Annotated high-throughput microscopy image sets for validation. Nat. Methods, 9 (7): 637, June 2012.

[30] Luke Melas-Kyriazi and Arjun K Manrai. PixMatch: Unsupervised domain adaptation via pixelwise consistency training. In 2021 IEEE/CVF Conference on Computer Vision and Pattern Recognition (CVPR). IEEE, June 2021,

[31] Ishan Misra and Laurens van der Maaten. Self-supervised learning of pretext-invariant representations. In 2020 IEEE/CVF Conference on Computer Vision and Pattern Recognition (CVPR). IEEE, June 2020.

[32] Saeid Motiian, Quinn Jones, Seyed Mehdi Iranmanesh, and Gianfranco Doretto. Few-shot adversarial domain adaptation. In Adv. Neural Inf. Process. Syst. (NIPS). papers.nips.cc, 2017.

[33] Saeid Motiian, Marco Piccirilli, Donald A Adjeroh, and Gianfranco Doretto. Unified deep supervised domain adaptation and generalization. In 2017 IEEE International Conference on Computer Vision (ICCV). IEEE, October 2017.

[34] Peter Naylor, Marick Lae, Fabien Reyal, and Thomas Walter. Segmentation of nuclei in histopathology images by deep regression of the distance map. IEEE Trans. Med. Imaging, 38 (2): 448-459, February 2019.

[35] Mauricio Orbes-Arteaga, Thomas Varsavsky, Carole H Sudre, Zach Eaton-Rosen, Lewis J Haddow, Lauge Sørensen, Mads Nielsen, Akshay Pai, S'ebastien Ourselin, Marc Modat, Parashkev Nachev, and M Jorge Cardoso. Multi-domain adaptation in brain MRI through paired consistency and adversarial learning. In Domain Adaptation and Representation Transfer and Medical Image Learning with Less Labels and Imperfect Data, pages 54-62. Springer International Publishing, 2019.

[36] Egor Panfilov, Aleksei Tiulpin, Stefan Klein, Miika T Nieninen, and Simo Saarakkala. Improving robustness of deep learning based knee MRI segmentation: Mixup and adversarial domain adaptation. In 2019 IEEE/CVF International Conference on Computer Vision Workshop (ICCVW), IEEE, October 2019.

[37] Christian S Perone, Pedro Baliester, Rodrigo C Barros, and Julien Cohen-Adad. Unsupervised domain adaptation for medical imaging segmentation with self-ensembling. Neuroimage, 194:1-11, July 2019.

[38] Olaf Ronneberger, Philipp Fischer, and Thomas Brox. U-Net: Convolutional networks for biomedical image segmentation, In Medical Image Computing and Computer-Assisted Intervention—MICCAI 2015, pages 234-241. Springer International Publishing, 2015.

[39] Doyen Sahoo, Hung Le, Chenghao Liu, and Steven C H Hoi. Meta-Learning with domain adaptation for Few-Shot learning under domain shift. September 2018.

[40] Uwe Schmidt, Martin Weigert, Coleman Broaddus, and Gene Myers. Cell detection with star-convex polygons. In Medical Image Computing and Computer Assisted Intervention—MICCAI 2018-21st International Conference, Granada, Spain, September 16-20, 2018, Proceedings, Part II, pages 265-273, 2018.

[41] Zahil Shanis, Samuel Gerber, Mingehen Gao, and Andinet Enquobahrie. Intramodality domain adaptation using self ensembling and adversarial training. In Domain Adaptation and Representation Transfer and Medical Image Learning with Less Labels and Imperfect Data, pages 28-36. Springer International Publishing, 2019.

[42] Hidetoshi Shimodaira. Improving predictive inference under covariate shift by weighting the log-likelihood function, J. Stat. Plan. Inference, 90(2):227-244, October, 2000.

[43] Kihyuk Sohn. Improved deep metric learning with multi-class n-pair loss objective. In Proceedings of the 30th International Conference on Neural Information Processing Systems, NIPS' 16, pages 1857-1865, Red Hook, NY, USA, December 2016. Curran Associates Inc.

[44] Carsen Stringer, Tim Wang, Michalis Michaelos, and Marius Pachitariu. Cellpose: a generalist algorithm for cellular segmentation. Nat. Methods, 18(1):100-106, January 2021.

[45] Aaron van den Oord, Yazbe Li, and Oriol Vinyals. Representation learning with contrastive predictive coding. arXiv e-prints, page arXiv:1807.03748, July 2018.

[46] Aaron van den Oord, Yazhe Li, and Oriol Vinyals. Representation learning with contrastive predictive coding. CoRR, abs/1807.03748, July 2018.

[47] Annegreet van Opbroek, Meike W Vernooij, M Arfan Ikram, and Marleen de Bruijne. Weighting training images by maximizing distribution similarity for supervised segmentation across scanners. Med. Image Anal., 24(1):245-254, August 2015.

[48] Feng Wang and Huaping Liu. Understanding the behaviour of contrastive loss. CoRR, abs/2012.09740, December 2020.

[49] Shujun Wang, Lequan Yu, Xin Yang, Chi-Wing Fu, and Pheng-Ann Heng. Patch-Based output space adversarial learning for joint optic disc and cup segmentation. IEEE Trans. Med. Imaging, 38(11):2485-2495, November 2019.

[50] Xinlong Wang, Rufeng Zhang, Chunhua Shen, Tao Kong, and Lei Li. Dense contrastive learning for self-supervised visual pre-training. In Proc. IEEE Conf Computer Vision and Pattern Recognition (CVPR), 2021.

[51] Martin Weigert, Uwe Schmidt, Robert Haase, Ko Sugawvara, and Gene Myers. Star-convex polyhedra for 3d object detection and segmentation in microscopy. In Proceedings of the IEEE/CVF Winter Conference on Applications of Computer Vision (WACV), March 2020.

[52] Wenqiang Xu, Yonglu Li, and Cewu Lu. SRDA: Generating instance segmentation annotation via scanning, reasoning and domain adaptation. In ECCV, pages 124-140. 2018.

[53] Siyi Xun, Dengwang Li, Hui Zhu, Min Chen, Jianbo Wang, Jie Li, Meirong Chen, Bing Wu, Hua Zhang, Xiangfei Chai, Zekun Jiang, Yan Zhang, and Pu Huang. Generative adversarial networks in medical image segmentation: A review, Comput. Biol. Med., 140:105063, November 2021.

[54] Wenjun Yan, Yuanyuan Wang, Shengjia Gu, Lu Huang, Fuhua Yan, Liming Xia, and Qian Tao. The domain shift problem of medical image segmentation and Vendor-Adaptation by U net-GAN. In Medical Image Computing and Computer Assisted Intervention—MICCAI 2019, pages 623-631. Springer International Publishing, 2019.

[55] Wenjun Yan, Yuanyuan Wang, Menghua Xia, and Qian Tao. Edge-Guided output adaptor: Highly efficient adaptation module for Cross-Vendor medical image segmentation. IEEE Signal Process. Lett., 26(11):1593-1597, November 2019.

[56] Junlin Yang, Nicha C Dvornek, Fan Zhang, Julius Chapiro, Mingde Lin, and James S Duncan. Unsupervised domain adaptation via disentangled representations: Application to Cross-Modality liver segmentation. In Medical Image Computing and Computer Assisted Intervention—MICCAI 2019, pages 255-263. Springer International Publishing, 2019.

[57] Linfeng Yang, Rajarshi P Ghosh, J Matthew Franklin, Simon Chen, Chenyu You, Raja R Narayan, Marc L Melcher, and Jan T Liphardt. NuSeT: A deep learning tool for reliably separating and analyzing crowded cells. PLoS Comput. Biol., 16(9):e1008193, September 2020.

[58] Siqi Yang, Jun Zhang, Junzhou Huang, Brian C Lovell, and Xiao Han. Minimizing labeling cost for nuclei instance segmentation and classification with cross-domain images and weak labels. AAAI, 35(1):697-705, May 2021.

[59] Chun-Hsiao Yeh, Cheng-Yao Hong, Yen-Chi Hsu, TyngLuh Liu, Yubei Chen, and Yann LeCun. Decoupled contrastive learning. CoRR abs/2110.06848, October 2021.

[60] Weimiao Yu, Hwee Kuan Lee, Srivats Hariharan, Wen Yu Bu, and Sohail Ahmed. Ccdb:6843, *Mus musculus*, neuroblastoma. CIL. Dataset. https://doi.org/doi:10.7295/V9CCDB6843.

[61] Hui Zhang, Yonglin Tian, Kunfeng Wang, Haibo He, and Fei-Yue Wang. Synthetic-to-Real domain adaptation for object instance segmentation. In IJCNN, pages 1-7, 2019.

[62] Tianyang Zhang, Jun Cheng, Huazhu Fu, Zaiwang Cu, Yuting Xiao, Kang Zhou, Shenghua Gao, Rui Zheng, and Jiang Liu. Noise adaptation generative adversarial network for medical image analysis. IEEE Trans. Med. Imaging, 39(4):1149-1159, April 2020.

[63] Yue Zhang, Shun Miao, Tommaso Mansi, and Rui Liao. Task driven generative modeling for unsupervised domain adaptation: Application to x-ray image segmentation. In Medical Image Computing and Computer Assisted Intervention—MICCAI 2018, pages 599-607. Springer International Publishing, 2018.

[64] An Zhao, Mingyu Ding, Zhiwn Lu, Tao Xiang, Yulei Niu, Jiechao Guan, and Ji-Rong Wen. Domain-adaptive few-shot learning. In 2021 IEEE Winter Conference on Applications of Computer Vision (VACV). IEEE, January 2021.

[65] Qikui Zhu, Bo Du, and Pingkun Yan. Boundary—Weighted domain adaptive neural network for prostate MR image segmentation. IEEE Trans. Med. Imaging, 39(3):753-763, March 2020.

[66] Chengxu Zhuang, Alex Zhai, and Daniel Yamins. Local aggregation for unsupervised learning of visual embeddings. In 2019 IEEE/CVF International Conference on Computer Vision (ICCV). IEEE, October 2019.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of object segmentation, comprising:

providing a neural network model pre-trained to segment object instances, the pre-trained model having been trained on a first set of images using a first loss function, wherein for an input image, the neural network model generates a pixel-wise feature where for a pixel in the input image, the pixel-wise feature provides a gradient flow that points towards a center of an object structure and provides a probability score indicating a probability of the pixel belonging to the object structure;

generating an adapted neural network model from the neural network model based on a second set of images that is smaller than and different from the first set of images and a second loss function, wherein the second loss function comprises a contrastive flow loss component and a contrastive mask loss component, wherein the contrastive flow loss component aligns gradient flows of pixels in the second set of images with gradient flows of pixels in the first set of images having a same label as the pixels in the second set of images, and wherein the contrastive mask loss component aligns probability scores of the pixels in the second set of images with probability scores of pixels in the first set of images having a same label as the pixels in the second set of images; and segmenting object instances in a test image based on the adapted neural network model, wherein aligning gradient flows of pixels in the second set of images with gradient flows of pixels in the first set of images having the same label as the pixels in the second set of images includes:

identifying a positive pixel in the first set of images that has the same label as a first pixel in the second set of images and has a gradient flow that is closest to a gradient flow of the first pixel, identifying a set of negative pixels in the first set of images that have the same label as the first pixel in the second set of images, wherein a similarity measure between the gradient flow of the positive pixel and the gradient flow of each negative pixel of the set of negative pixels is less than a threshold value, and adjusting parameters of the neural network model such that the gradient flow of the positive pixel gets closer to the gradient flow of the first pixel and gradient flow of each of the negative pixels gets more dissimilar to the gradient flow of the first pixel.

2. The method of claim 1, wherein the second set of images includes at least one and at most ten images.

3. The method of claim 1, wherein the object instances include cellular instances and wherein the object structure includes a cell structure.

4. The method of claim 1, wherein generating the adapted neural network model from the neural network model comprises training the neural network model on each image of the second set of images.

5. The method of claim 1, wherein the neural network model is a Cellpose neural network model.

6. The method of claim 1, wherein the similarity measure is determined based on cosine similarity.

7. The method of claim 1, wherein the contrastive flow loss component is determined based on an aggregate of comparative flow loss associated with each of a plurality of pixels in image patches of the first set of images and the second set of images.

8. The method of claim 1, wherein a number of the set of negative pixels is selected to be the same for all pixels from the second set of images.

9. A method of object segmentation, comprising:

providing a neural network model pre-trained to segment object instances, the pre-trained model having been trained on a first set of images using a first loss function, wherein for an input image, the neural network model generates a pixel-wise feature where for a pixel in the input image, the pixel-wise feature provides a gradient flow that points towards a center of an object structure and provides a probability score indicating a probability of the pixel belonging to the object structure;

generating an adapted neural network model from the neural network model based on a second set of images that is smaller than and different from the first set of images and a second loss function, wherein the second loss function comprises a contrastive flow loss component and a contrastive mask loss component, wherein the contrastive flow loss component aligns gradient flows of pixels in the second set of images with gradient flows of pixels in the first set of images having a same label as the pixels in the second set of images, and wherein the contrastive mask loss component aligns probability scores of the pixels in the second set of images with probability scores of pixels in the first set of images having a same label as the pixels in the second set of images; and segmenting object instances in a test image based on the adapted neural network model, wherein aligning probability scores of the pixels in the second set of images with probability scores of pixels in the first set of images having a same label as the pixels in the second set of images includes:

identifying a set of positive pairs of probability scores, each positive pair of probability score corresponding to pixels with the same label in same positions in an image patch of the first set of images and an image patch of the second set of images, identifying a set of negative pairs of probability scores, each negative pair of probability score corresponding to pixels with different labels in same positions in the image patch in the first set of images and in the image patch in the second set of images, and adjusting parameters of the neural network model such that a measure of similarity between pairs of pixels with the same label is maximized and a measure of similarity between pairs of pixels with different labels is minimized.

10. The method of claim 9, wherein whether pixels are in same positions is determined by overlapping the image patch of the first set of images with the image patch of the second set of images.

11. A non-transitory computer readable storage medium including instructions which when executed by one or more processors cause the processor to execute a method comprising:

providing a neural network model pre-trained to segment object instances, the pre-trained model having been trained on a first set of images using a first loss function, wherein for an input image, the neural network model generates a pixel-wise feature where for a pixel in the input image, the pixel-wise feature provides a gradient flow that points towards a center of an object structure and provides a probability score indicating a probability of the pixel belonging to the object structure;

generating an adapted neural network model from the neural network model based on a second set of images that is smaller than and different from the first set of images and a second loss function, wherein the second loss function comprises a contrastive flow loss component and a contrastive mask loss component, wherein the contrastive flow loss component aligns gradient flows of pixels in the second set of images with gradient flows of pixels in the first set of images having a same label as the pixels in the second set of images, and wherein the contrastive mask loss component aligns probability scores of the pixels in the second set of images with probability scores of pixels in the first set of images having a same label as the pixels in the second set of images; and segmenting object instances in a test image based on the adapted neural network model, wherein aligning gradient flows of pixels in the second set of images with gradient flows of pixels in the first set of images having the same label as the pixels in the second set of images includes:

identifying a positive pixel in the first set of images that has the same label as a first pixel in the second set of images and has a gradient flow that is closest to a gradient flow of the first pixel, identifying a set of negative pixels in the first set of images that have the same label as the first pixel in the second set of images, wherein a similarity measure between the gradient flow of the positive pixel and the gradient flow of each negative pixel of the set of negative pixels is less than a threshold value, and adjusting parameters of the neural network model such that the gradient flow of the positive pixel gets closer to the gradient flow of the first pixel and gradient flow of each of the negative pixels gets more dissimilar to the gradient flow of the first pixel.

12. The non-transitory computer readable storage medium of claim 11, wherein the second set of images includes at least one and at most ten images.

13. The non-transitory computer readable storage medium of claim 11, wherein the object instances include cellular instances and wherein the object structure includes a cell structure.

14. The non-transitory computer readable storage medium of claim 11, wherein generating the adapted neural network model from the neural network model comprises training the neural network model on each image of the second set of images.

15. The non-transitory computer readable storage medium of claim 11, wherein the neural network model is a Cellpose neural network model.

16. The non-transitory computer readable storage medium of claim 11, wherein the similarity measure is determined based on cosine similarity.

17. The non-transitory computer readable storage medium of claim 11, wherein the contrastive flow loss component is determined based on an aggregate of comparative flow loss associated with each of a plurality of pixels in image patches of the first set of images and the second set of images.

18. The non-transitory computer readable storage medium of claim 11, wherein a number of the set of negative pixels is selected to be the same for all pixels from the second set of images.

19. A non-transitory computer readable storage medium including instructions which when executed by one or more processors cause the processor to execute a method comprising:

providing a neural network model pre-trained to segment object instances, the pre-trained model having been trained on a first set of images using a first loss function, wherein for an input image, the neural network model generates a pixel-wise feature where for a pixel in the input image, the pixel-wise feature provides a gradient flow that points towards a center of an object structure and provides a probability score indicating a probability of the pixel belonging to the object structure;

generating an adapted neural network model from the neural network model based on a second set of images that is smaller than and different from the first set of images and a second loss function, wherein the second loss function comprises a contrastive flow loss component and a contrastive mask loss component, wherein the contrastive flow loss component aligns gradient flows of pixels in the second set of images with gradient flows of pixels in the first set of images having a same label as the pixels in the second set of images, and wherein the contrastive mask loss component aligns probability scores of the pixels in the second set of images with probability scores of pixels in the first set of images having a same label as the pixels in the second set of images; and segmenting object instances in a test image based on the adapted neural network model, wherein aligning probability scores of the pixels in the second set of images with probability scores of pixels in the first set of images having a same label as the pixels in the second set of images includes:

identifying a set of positive pairs of probability scores, each positive pair of probability score corresponding to pixels with the same label in same positions in an image patch of the first set of images and an image patch of the second set of images, identifying a set of negative pairs of probability scores, each negative pair of probability score corresponding to pixels with different labels in same positions in the image patch in the first set of images and in the image patch in the second set of images, and adjusting parameters of the neural network model such that a measure of similarity between pairs of pixels with the same label is maximized and a measure of similarity between pairs of pixels with different labels is minimized.

20. The non-transitory computer readable storage medium of claim 19 wherein whether pixels are in same positions is determined by overlapping the image patch of the first set of images with the image patch of the second set of images.

* * * * *